Feb. 1, 1966  W. J. McCLIVE  3,232,586
SINGLE-WHEELED CONCRETE MIXER AND VEHICLE HITCH THEREFOR
Filed Aug. 22, 1960  4 Sheets-Sheet 3
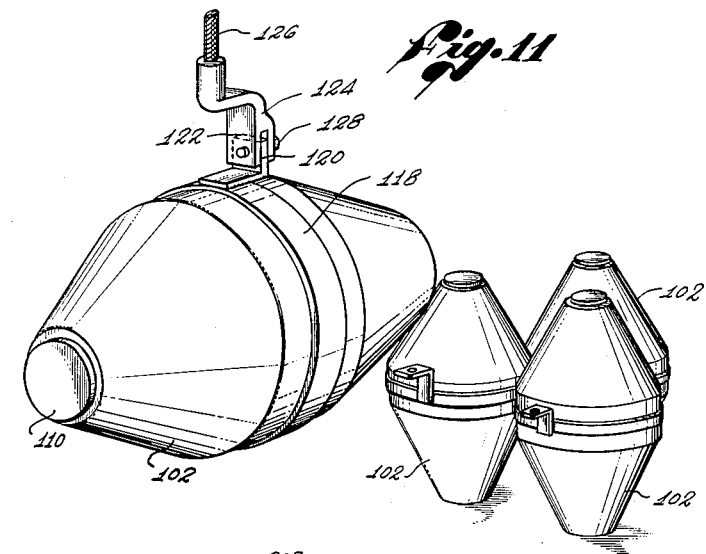
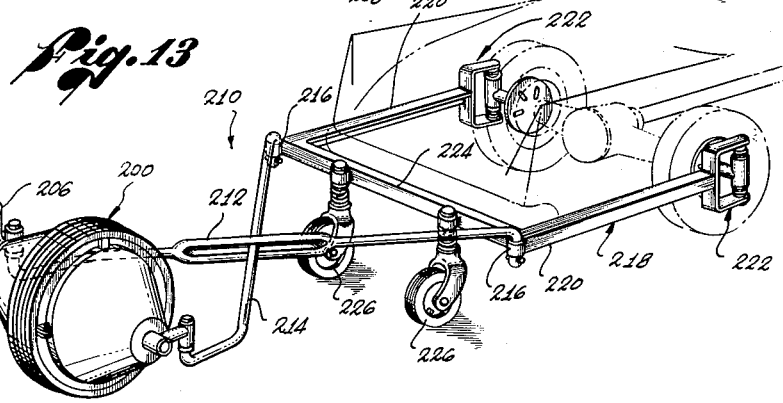
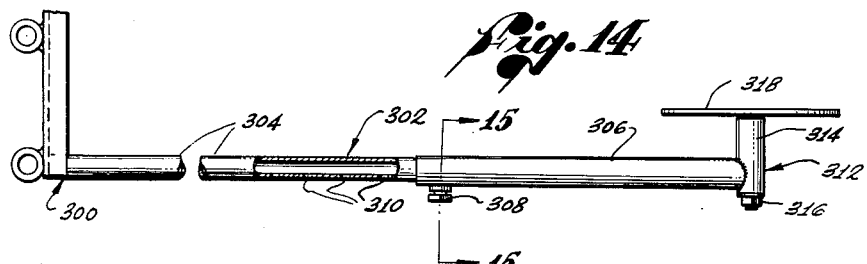
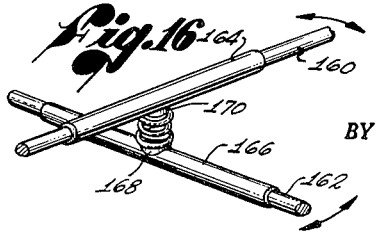
INVENTOR.
WILLIAM J. McCLIVE
BY
Lilly & Nyhagen
Attorneys INVENTOR.
WILLIAM J. McCLIVE
BY Lilly & Nyhagen
Attorneys United States Patent Office 3,232,586
Patented Feb. 1, 1966

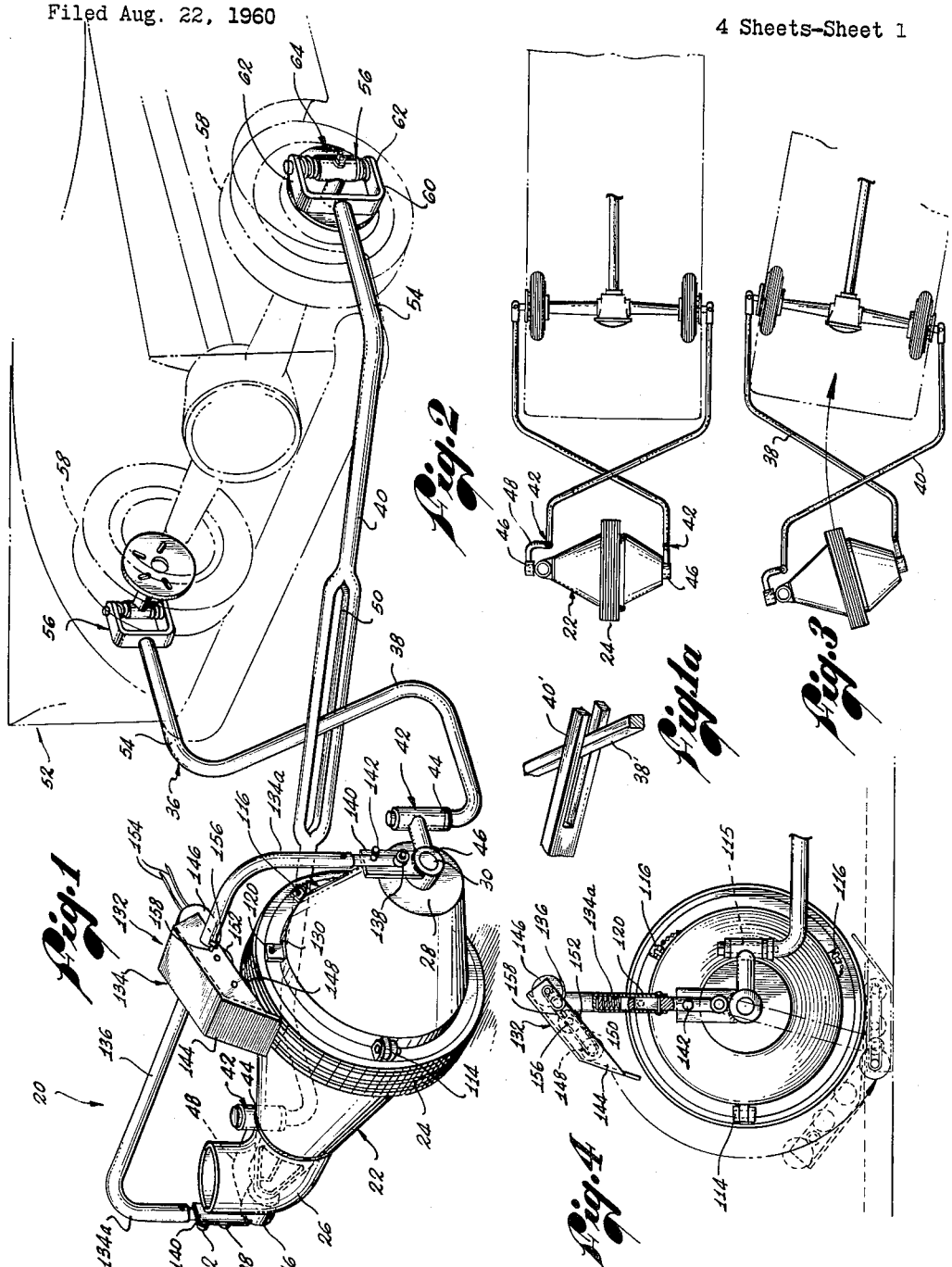

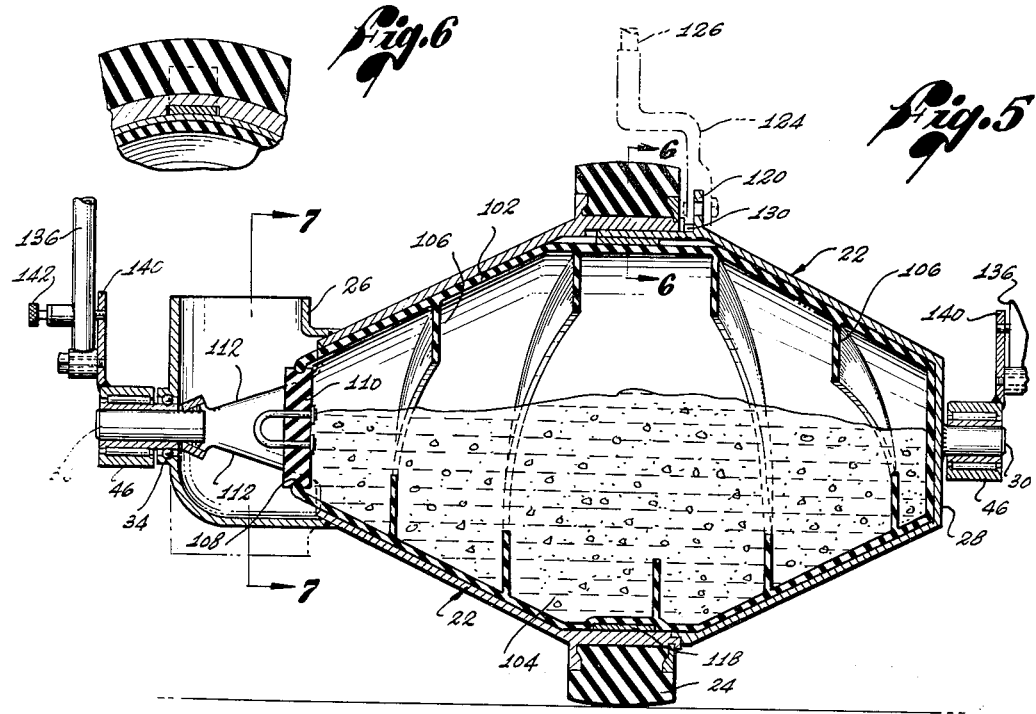
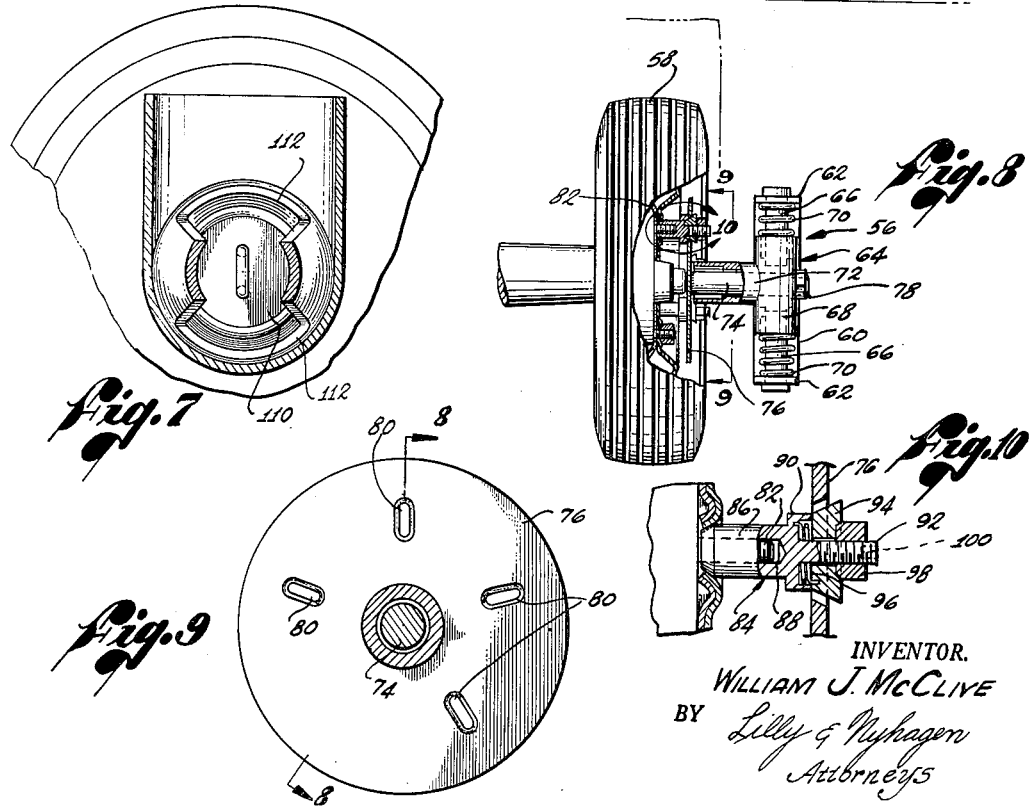

3,232,586
SINGLE-WHEELED CONCRETE MIXER AND
VEHICLE HITCH THEREFOR
William J. McClive, 24019 Hartland, Canoga Park, Calif.
Filed Aug. 22, 1960, Ser. No. 50,982
5 Claims. (Cl. 259—169)

This invention deals generally with concrete mixing devices and has as its general object to provide a new and unique concrete transit mixer which rolls on the ground and is rotated, to agitate a concrete mix contained therein, while being towed behind an automotive vehicle en route to a job site.

Another object of the invention is to provide a concrete transit mixer of the character described having a concrete mixing drum with a single, centrally located, ground-engaging wheel or tread, and a new and unique vehicle hitch for the drum which restrains the drum against endwise tipping on its single, central tread and steers the drum during turning of the towing vehicle in such a way that the drum accurately follows the curved path of the vehicle.

Yet another object of the invention is to provide a concrete transit mixer and a vehicle hitch therefor of the character described in which the arms of the vehicle hitch are attached to the rear drive wheels of the towing vehicle so that forces and loads imposed on the vehicle by the mixer both at standstill and during transit are not applied to the chassis or spring suspension system of the towing vehicle but are transmitted directly to the ground through the rear wheels whereby the mixer does not create any side sway, unnecessary lateral tipping, longitudinal dipping of the towing vehicle, or jolting of the vehicle chassis.

An object of the invention closely allied with the foregoing object is to provide a concrete transit mixer vehicle hitch of the character described in which lateral leaning of the chassis of the towing vehicle toward the outside of the curve under the action of centrifugal force during cornering does not cause leaning of the mixing drum toward the outside of the curve, owing to the attachment of the hitch arms to the rear wheels of the towing vehicle, and wherein, further, the hitch is designed to cause the mixing drum to lean toward the inside of the curve during cornering by an amount related to the sharpness of the turn so as to offset the action of centrifugal force on the drum.

Still another object of the invention is to provide a concrete transit mixer of the character described in which the mixing drum has internal helical vanes which constantly feed the concrete mix in the drum toward its center during forward rotation of the drum so as to achieve maximum balance of the drum and feed the mix toward and through an end discharge opening in the drum during reverse rotation of the latter.

An object of the invention associated with the foregoing object is to provide a concrete transit mixer of the character described in which the drum is rotated in the reverse direction to discharge mixed concrete therefrom either by backing of its towing vehicle or by operation of an auxiliary drive unit carried on the mixer, which unit can be used, as well, for rotating the drum in the forward direction to mix the concrete contained in the drum while the mixer remains stationary on the job site.

Yet a further object of the invention is to provide a concrete transit mixer of the character described embodying a unique cartridge to contain the concrete mix, which cartridge is removable from the mixing drum when empty for replacement by a full cartridge and serves the dual function of a storage container for holding the ingredients of the concrete mix until needed.

An object of the invention closely associated with the foregoing object is to provide a concrete transit mixer and vehicle hitch of the character described in which the mixing drum has two swingably connected ends which can be hinged open to permit placing a cartridge in and removing it from the drum, and the vehicle hitch is uniquely designed to accomplish this opening and closing of the drum by movement of the towing vehicle.

Other objects, advantages and features of the invention will become readily apparent as the description proceeds.

Briefly, these objects are attained by providing a rotary concrete mixing drum which is conically tapered at each end and mounts a single, ground-engaging wheel or tread at its center. Such a single wheel drum is especially suited to the present use because it is relatively simple and economical to manufacture, subject to less wobbling and whipping due to irregularities in the pavement than two wheeled towed vehicles, and eliminates the necessity of using two extremely large wheels to avoid the possibility of the body of the drum striking bumps in the road as would be necessary with a two wheeled drum, the center of which would be prone to striking such bumps unless it was elevated sufficiently above the road by excessively large wheels. The concrete mix is contained either directly in this drum or in a replaceable cartridge in the drum which can be removed when empty and replaced by a full cartridge by swinging open the two hingeably connected end sections of the drum. These cartridges can serve the additional function of a storage container for holding the ingredients of the mix in an unmixed state until needed. The primary reason for the cartridges, however, is to overcome the legal restrictions against batching concrete in certain zones, which generally are those zones where businesses capable of vending the present mixer loads, such as lumber yards and equipment rental yards, are located. Thus, the present invention permits batch loading of the cartridges in heavy industrial zones, where concrete batching is permitted by most zoning plans. The loaded but unmixed cartridges are then sealed and delivered in an upright position to the more restricted zones for vending, with the mixer, where a better retail market exists.

The vehicle hitch comprises two crossed hitch arms which are slidably connected intermediate their ends. The mixing drum is located between and pivotally connected to one end of these arms, the other ends of which carry rotatable coupling plates for attachment to the rear wheels of a towing vehicle. In this way, the loads and forces imposed on the towing vehicle are transmitted directly to the ground through the rear wheels rather than to the chassis and spring suspension system of the vehicle, and jolting, side sway, and longitudinal dipping of the vehicle by these forces and loads is avoided.

Attachment of the hitch arms to the rear vehicle wheels also isolates the vehicle chassis from the mixing drum which, therefore, is not forced to lean toward the outside of the curve with the chassis during cornering. As a matter of fact, one form of the present hitch is designed to produce inward leaning of the mixing drum toward the inside of the curve during cornering by an amount related to the sharpness of the curve so as to offset the action of centrifugal force on the drum. The construction of the hitch is also such as to steer the drum during a turn, in such a way that the drum accurately follows the curved path of the towing vehicle.

Due to the high specific gravity of concrete, which is roughly 150 pounds per cubic foot, a mechanical advantage is required in the vehicle hitch to balance a practical payload in the mixing drum on its single, central tread. This is achieved herein by the crossed arm construction of the vehicle hitch in which each hitch arm acts, in effect, like a lever which is attached at one end to a rear vehicle wheel, at its other end to an end of the mixing drum, and is fulcrumed intermediate its ends on the other hitch arm at a position close to the drum. In this way, a given force on the drum end of the arm is balanced by a smaller force on the wheel end of the arm, thereby achieving the mechanical advantage required. The attachment of the arms to the rear wheels permits a maximum hitch arm length, and hence a maximum mechanical advantage with a minimum distance of the mixing drum to the rear of the towing vehicle, and, therefore, a minimum turning radius.

In accordance with one manner of use, the present concrete mixer is furnished, loaded, by a vendor on a rental basis so as to provide a never-before-available transit mix price to the small volume consumer. In this case, the mixer is attached to the user's car at the rental station. During towing of the mixer to the job site, the mixing drum is rotated to thoroughly mix the concrete mix in the drum, such mixing occurring mostly during slow speed motion, stopping and starting, the mix remaining inert in the drum during cruising due to centrifugal force, thereby permitting higher cruising speeds.

The mixed concrete is discharged from an end opening in the drum, during rotation of the latter in the reverse direction, by the action of helical vanes which feed the mix toward the center of the drum during forward rotation of the latter for maximum balance. The drum is rotated in the reverse direction for this purpose either by backing of its towing vehicle or by means of an auxiliary drive unit on the mixer which may, as well, be used for driving the drum in the forward direction of rotation to mix the concrete at the job site in the manner of a conventional mixer.

A better understanding of the invention may be had from the following detailed description thereof, taken in connection with the annexed drawings, wherein:

FIG. 1 is a view, in perspective, illustrating the present concrete mixer attached to a towing vehicle;

FIG. 1a illustrates a modified type of hitch arms;

FIG. 2 is a plan view, on reduced scale, of the mixer in FIG. 1;

FIG. 3 is a view similar to FIG. 2 illustrating how the vehicle hitch of the mixer hinges when the latter is towed around a corner;

FIG. 4 is an end view of the mixing drum of FIG. 1;

FIG. 5 is an enlarged vertical section through the mixer drum;

FIG. 6 is a section taken along line 6—6 of FIG. 5;

FIG. 7 is an enlarged section taken along line 7—7 of FIG. 5;

FIG. 8 is an enlarged view, partially in section, illustrating the manner in which the arms of the vehicle hitch of FIG. 1 are attached to the rear wheels of the towing vehicle;

FIG. 9 is an enlarged section taken along line 9—9 of FIG. 8;

FIG. 10 is an enlargement, partly in section, of the area encircled by the arrow 10 in FIG. 8;

FIG. 11 is an enlarged view, in perspective, illustrating the replaceable concrete mix cartridges which are used in the mixer of FIG. 1 and the method of handling said cartridges;

FIG. 13 is a view in perspective of a modified concrete mixer according to the invention;

FIG. 14 illustrates a modified hitch arrangement for use in the mixer of FIG. 13;

FIG. 15 is a section taken along line 15—15 of FIG. 14;

FIG. 16 illustrates an alternative way of slidably interconnecting the arms of the vehicle hitch;

Figure 12:
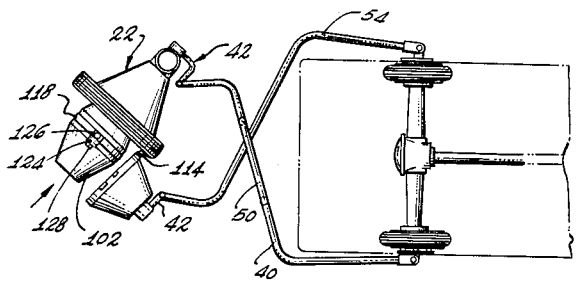
FIG. 12 is a view on reduced scale illustrating the manner in which the cartridges of FIG. 11 are placed in and removed from the concrete mixing drum.

The concrete mixer 20 illustrated in FIGS. 1–12 of these drawings comprises a rotary mixing drum 22. This mixing drum is conically tapered from its center toward each end, as shown. Extending about the center of the drum is a ground-engaging wheel or tread 24. A right angle spout 26 is rotatably mounted on the left-hand end of the mixing drum, as the latter is viewed in the drawings. This spout can be turned from its normal, solid line position of FIG. 5, wherein the spout opens upwardly, to its phantom line inverted position of that figure, wherein the spout opens downwardly. As will shortly be seen, the spout 26 is placed in its normal upright position when the mixer is being towed and is turned to its inverted position to permit discharge of mixed concrete from the drum.

The right-hand end of the drum has a circular end wall 28. Rigidly fixed to this end wall, on the axis of the drum, is an axle 30. The left-hand end of the drum extends through the spout 26 and has its extreme left-hand end positioned just slightly from the inner wall of the spout. Rigidly fixed in this end of the drum, on the axis of the latter, is a second axle 32. The spout 26 is rotatably supported on this axle by means of a bearing 34.

The vehicle hitch 36 of the invention comprises a pair of crossed hitch arms 38 and 40 between the rear ends of which the mixing drum 22 is located. The rear ends of the hitch arms are bent upwardly and mount vertical pivot bearings 42. Rigidly fixed to the rotatable parts 44 of these pivot bearings are journal bearings 46 which rotatably receive the axles 30 and 32 on the mixing drum 22. The location of the left-hand journal bearing 46 outboard of the drum spout 26 places that bearing a greater distance from the tread 24 than the right-hand journal bearing 46. Maximum stability in towing the drum, however, requires that the two pivot bearings 42 be located approximately equal distances from the tread. To this end, the left-hand pivot bearing 42 is connected with its respective journal bearing 46 by means of a curved arm 48 which bends forwardly and inwardly of the drum 22, as may be observed best in FIGS. 2 and 3, to permit the left-hand pivot bearing 42 to be located approximately the same distance from the tread 24 as the right-hand pivot bearing.

Hitch arm 38, which supports the right-hand end of the mixing drum 22, extends slidably through a longitudinal slot 50 in the hitch arm 40 to the left-hand side of the towing vehicle 52. The hitch arm 40, which supports the left-hand end of the mixing drum 22, extends to the right-hand side of the towing vehicle. The forward end portions 54 of these hitch arms are substantially parallel and extend forwardly along opposite sides of the towing vehicle. Mounted on the forward ends of the arms are vehicle attachment means 56 for connecting the arms to the rear wheels 58 of the towing vehicle.

The vehicle attachment means 56 are identical and each comprises a U-shaped bracket 60 having its crosspiece rigidly fixed to the adjacent hitch arm and its two legs 62 approximately parallel to the plane of the hitch arms. Mounted on the bracket is a normally vertically pivot bearing 64 consisting of vertical, coaxial pins 66 which extend rotatably into opposite ends of a bearing sleeve 68. Springs 70 are interposed between the ends of the bearing sleeve 68 and the legs 62 of the bracket so that the forward ends of the hitch arms 38 and 40 are resiliently supported on their respective bearing sleeves 68.

Rigidly fixed to and extending at right angles from each bearing sleeve 68 is a normally horizontal journal bearing 72. This journal bearing rotatably supports a shaft 74. One end of the shaft extends beyond the end of the journal bearing and is rigidly and coaxially fixed to a wheel coupling disc or plate 76. The other end of the shaft 74 extends rotatably through a hole in the pivot bearing sleeve 68 and mounts a thrust bearing 78 which retains the shaft against axial movement from the journal bearing.

Coupling plate 76 is formed with a series of angularly spaced, radial slots 80. These slots are located to be aligned with the lug bolts 82 on the rear wheels of the towing vehicle. Slots 80 have tapered walls, as shown. The space on the coupling plate corresponding to one belt location is not radially slotted, as may be observed best in FIG. 9, for reasons to be presently seen.

Received in each of the radial slots 80 is a wheel fastening device 84 consisting of a cylindrical body 86 having, at one end, a threaded hole 88 to receive a lug bolt 82. At the other end of this body is an enlarged head or shoulder 90 from which extends a reduced, threaded stem 92. Stem 92 projects through the adjacent coupling plate slot and slidably receives an elongated washer 94. This washer has tapered edge surfaces matching the tapered side walls of its slot. The tapered washer is laterally proportioned to seat in its respective tapered slot but has a length somewhat less than that of the slot so as to be capable of limited longitudinal movement in its slot for the purpose of accommodating different lug spacings.

Acting between the washer 94 and the body 86 of its respective fastening device is a spring 96. This spring is secured at one end to the body of the fastening device and at the other end to the washer so as to permit movement of the washer along and yet retain the washer on its threaded stem 92. The enlarged head 90 of the fastener body is relieved to receive the spring, as shown. The threads on the fastener stem 92 match those on the wheel lug bolts so that the wheel lug nuts may be threaded on the stem, as shown, to firmly fix the coupling plate to its fasteners 84.

Each coupling plate 76 is attached to its respective wheel 58 of the towing vehicle by first removing all but one lug nut from the wheel. This one lug nut is left on the wheel in order to retain the latter in position. The coupling plate is then placed over the lug nuts and the fasteners 84 on the plates are aligned with and threaded tightly on the lug bolts 82 by engagement of a wrench in a wrench socket 100 in the end of each fastener stem 92. The fasteners act, then, as lug nuts for the wheel. Finally, the lug nuts 98, which were removed, are threaded on the fastener stems 92 to securely clamp the coupling plate in position.

It is evident that the single tread design of the mixing drum 22 presents a problem of balance of the drum. The vehicle hitch 36 is uniquely designed to restrain the drum against endwise tipping. That is to say, each hitch arm acts, in effect, as a lever which is connected at its front end to a rear wheel of the towing vehicle and at its rear to an end of the mixing drum and is fulcrumed intermediate its ends on the other lever arm at the point where the arms cross and are interconnected by the extension of one arm through slot 50 in the other arm. Any upward or downward force on the rear end of an arm, therefore, due to longitudinal unbalance of the drum, tends to rock the arm about its fulcrum on the other arm, which rocking, and, hence, endwise tipping of the drum, is resisted by an opposing force exerted on the forward end of the arm by the corresponding rear wheel of the towing vehicle.

By crossing the arms close to the drum, as shown, so as to make the lever arm between the forward end of each arm and the fulcrum point of that arm on the other arm longer than the lever arm between the fulcrum point and the rear end of each arm, a mechanical advantage is gained which enables an unbalance force on the rear end of each hitch arm to be resisted or balanced by a smaller force on the forward end of each hitch arm.

This mechanical advantage is essential to balancing of the drum on its single, central tread with a practical payload of concrete in the drum. That is to say, the concrete in the drum might, because of its high specific gravity on the order of 150 pounds per cubic foot, give rise to unbalance forces of such magnitude as to lift one rear wheel of the towing vehicle off of the ground if it were not for the mechanical advantage gained by the present hitch construction.

The mechanical advantage is maximized, without increasing the turning radius of the mixer and towing vehicle, by attaching the hitch arms to the rear wheels of the towing vehicle. The reason for this is that the hitch arms, and, therefore, the forward lever arms from the forward end of each arm to its fulcrum on the other arm, then have a maximum length for a given distance of the mixing drum to the rear of the towing vehicle. If the hitch arms are attached to the rear of the towing vehicle, the drum must be located a greater distance to the rear of the vehicle, with a resultant increase in the turning radius of the mixer and vehicle, for the same hitch arm length and, therefore, mechanical advantage. This attachment of the hitch arms to the rear wheels has other important advantages which will be pointed out shortly. Also, as will presently be described, the longitudinal balance of the mixing drum in transit is aided by the action of helical vanes in the drum.

The pivot bearing connections 42 and 64 obviously also aid in restraining the mixing drum against endwise tipping. In fact, if the mixing drum is small, so as to not contain a very heavy payload, and these pivot bearing connections are made sufficiently rigid, the slidable connection between the hitch arms may be omitted and the mixing drum balanced entirely by the pivot bearing connections.

It is obvious that with the hitch construction of FIG. 1, in which the tubular hitch arm 38 is capable of rotational movement within the slot 50 in the other hitch arm, vertical pivot bearing connections must be employed between the hitch arms and the mixing drum and towing vehicle in order to provide the hitch with the rigidity against twisting required to restrain the mixing drum against endwise tipping. Ball and socket connections could not be employed in place of the pivot bearing connections in the hitch of FIG. 1, for example. However, if the inner hitch arm 38' is made noncircular, as illustrated in FIG. 1a, to restrain it against rotational movement in the slot 50' of the other hitch arm 40', ball and socket connections may be employed between the hitch and the mixing drum and towing vehicle.

From the description thus far, it is evident that the vehicle hitch of the invention may be conveniently attached to a towing vehicle for towing of the mixing drum 22 behind the vehicle. During towing, of course, the mixing drum rolls along the ground and it thereby rotates to agitate a concrete mixture contained in the drum, as will presently be described. The pivot connections between the hitch and the mixing drum and towing vehicle and the slidable connection between the hitch arms accommodates towing of the drum around corners during which the hitch arms slide with respect to one another, as illustrated in FIG. 3. When making a right-hand turn, as illustrated in this latter figure, for example, a pull or tension force is exerted on hitch arm 38 and a push or compression force is exerted on hitch arm 40 to steer the drum in such a way that it accurately follows the curved motion of the towing vehicle.

Referring now to FIG. 6, there is contained within the mixing drum 22 a replaceable container or cartridge 102 which contains the concrete mixture 104. Cartridge 102 preferably comprises a slightly flexible material, such as polyethylene plastic, so that any concrete residue which remains in the cartridge after use and sets will crack and break away from the cartridge walls due to flexing of the latter in use, thereby eliminating the need for cleaning the cartridge at any time. The cartridge has internal helical vanes 106 which are inclined to feed the concrete mixture toward the center of the drum when the latter rotates slowly in a forward direction, i.e., the direction in which it turns as it is towed forwardly over the ground. The vanes are inclined in this way so that during towing, the bulk of the concrete mixture will be fed toward and retained at the center of the drum for maximum balance of the latter. The stability, as well as the longitudinal balance, of the drum in transit is also enhanced by the fact that agitation of the concrete mix in the drum occurs only at slow speeds. At cruising speeds, the mix becomes evenly distributed and tends to remain inert in the drum under the action of centrifugal force rather than sloshing around. This, in turn, permits higher cruising speeds.

When the drum is rotated slowly in the reverse direction, the vanes 106 at the left-hand end of the cartridge 102 feed the concrete mixture 104 toward the left end of the cartridge which contains an opening 108. This opening is normally closed by a plug 110 which can be removed by reaching through the open end of the spout 26 and through openings 112 in the left end of the mixing drum 22 which extends into the spout 26.

The ends of the mixing drum are hinged at 114 for swinging to an open position illustrated in FIG. 12 to permit the cartridge 102 to be placed in and removed from the drum. When placing the cartridge 102 in or removing it from the drum, the latter is first rotated to the position of FIG. 12, wherein the axis of the hinge 114 is vertical and is located forwardly on the drum. Latch means 116, which normally lock the right-hand end of the drum in its closed position, are then released.

After placing a patch of grease, on the pavement, under and directly in front of the tread 24 on the drum, the towing vehicle is driven forwardly a short distance during which the ends of the drum are pulled open, the tread 24 skidding sideways on the grease. The drum is closed by backing the towing vehicle to swing the two ends of the drum together.

In order to facilitate handling of the cartridge 102 when it is being placed in or removed from the mixing drum, the cartridge is provided with a fixed, circumferential metal band 118 to which is rigidly fixed a lifting bracket 120. This bracket is receivable in a slot 122 in a cooperating bracket 124 on the lower end of a hoist cable 126. The cartridge bracket 120 and the hoist bracket 124 are adapted to be releasably connected by means of a bolt 128 which can be inserted through holes in the brackets, as illustrated in FIG. 11. The cartridge bracket 120 is offset from the center of the cartridge and the hoist bracket 124 is bent, as shown, to permit the hoist cable 126 to be located in line with the center of gravity of the cartridge when it is loaded with a concrete mix and yet permit the left-hand end of the cartridge to be fully inserted into the left-hand end of the mixing drum while the cartridge is still supported by the hoist cable 126, as indicated in phantom lines in FIG. 5. The hinged, right-hand end of the mixing drum has a slot 130 to clear the cartridge lifting bracket 120 when the end is closed. Thus, the cartridge 102 can be supported by the hoist cable 126 until the right-hand end of the drum is locked in its closed position. This hoist bracket also restrains the cartridge from rotating within the drum.

In practice, the concrete mix 104, consisting of cement, sand, rock and water, will be stored in cartridges 102 which are normally placed on end, as shown in FIG. 11. The cement within the cartridges will be at the top and separated from the water and sand at the bottom of the cartridge by a layer of rock. When making a batch of concrete, the mixing drum 22 is opened and a cartridge 102 is placed therein with the aid of the hoist cable 126. The drum is then reclosed.

The drum is now towed to the job site by the vehicle 52 and is thereby rotated to thoroughly mix its contents. During this towing of the drum, the vanes 106 on the inside of the cartridge 102 feed the concrete mixture toward the center of the drum to maintain its balance, as already discussed.

After arrival on the job site, the drum having been towed sufficiently to assure proper mixing of the drum contents, the cartridge plug 110 is removed by reaching through the spout 26. A receptacle, such as a wheelbarrow, is now placed under the spout, which is then turned to its inverted, phantom line position of FIG. 5, and the mixed concrete is discharged from the drum into the receptacle by rotation of the drum in the reverse direction. During this reversed rotation of the drum, the vanes 106 at the left-hand end of the cartridge 102 feed the concrete toward and through the cartridge opening 108 into the spout 26. The vanes 106 at the right-hand end of the cartridge, of course, feed the concrete toward the right-hand end of the drum during this reversed rotation thereof. However, an amount of concrete will always tend to flow from the right-hand end of the drum toward its center, over and against the action of the right-hand vanes 106, as the concrete is discharged from the left-hand end of the drum.

One way in which the drum may be rotated in the reverse direction to discharge the concrete therefrom is by merely backing the towing vehicle. In this case, the wheelbarrow or other receptacle into which the mixed concrete is discharged will be moved rearwardly with the mixing drum. The vehicle hitch accurately steers the mixing drum during backing exactly in the tracks of the towing vehicle so that the usual difficulty in backing a conventional towed vehicle is avoided in the present invention.

In order to simplify this unloading procedure, the illustrative mixer is provided with a drive unit 132 for driving the drum 22 in the reverse direction of rotation while it remains in a fixed location. Drive unit 132 comprises a frame 134 which is rotatably supported on a U-shaped bar 136 extending axially of the mixing drum. The ends of this bar comprise spring loaded, telescoping sections 134a which are pivotally mounted, by means of bolts 138, on upstanding plates 140 welded or otherwise rigidly joined to the mixing drum journal bearings 46. The drive unit 132 is swingable, with its supporting bar 136, from the solid line retracted position of FIG. 4, wherein the drive unit is located above the mixing drum, through the dotted line position of that figure to the phantom line position in which the unit is located below the tread 24. The drive unit and its supporting bar are retained in their retracted position by means of releasable, spring-biased lock pins 142 which engage in holes in the plates 140. When opening the drum, as in FIG. 12, the drive unit is disconnected at one end from the drum. For clarity, however, the drive unit has been completely omitted in FIG. 12.

When towing the mixing drum, the drive unit occupies its retracted position. When mixed concrete is to be discharged from the mixing drum, the lock pins 142 are released and the drive unit 132 is swung downwardly to its dotted line position of FIG. 4 wherein a forward, inclined plate 144 on the drive unit housing 134 rests flatly on the ground. The mixing drum is then backed onto the drive unit so that the latter is located below the drum, as in the phantom line position of the unit in FIG. 4.

The drive unit comprises a motor 146, a friction drive roller 148 driven from the motor 146, through a drive belt 150, and an idler roller 152. In the active, phantom line position of the drive unit 132, the tread 24 of the mixing drum is supported on the friction rollers 148 and 152 so that the mixing drum is rotated in the reverse direction, i.e., the counterclockwise direction as the drum is viewed in FIG. 4, when the motor 146 of the drive unit is energized. This motor has electrical leads 154 for connection to a suitable electrical power source, such as the battery of the towing vehicle 52. During this reverse rotation of the mixing drum by the drive unit, concrete is discharged from the drum, through the inverted spout 26, into a suitable receptacle therebelow, as described earlier. It is obvious, of course, that the motor 146 can be energized to rotate the drum forwardly for mixing concrete in the manner of a conventional mixer. In this case, however, it is preferable that a small gasoline engine be used to rotate the drum.

The drive unit 132 is rotatable on its supporting bar 136 and the latter is spring loaded to permit the friction rollers 148 and 152 to rock into engagement with the tread 24 during movement of the drive unit to its phantom line active position of FIG. 4. In order to prevent the forward end of the drive unit from swinging downwardly into contact with the tread 24 on the mixing drum when the unit is in its retracted position, the supporting bar 136 mounts a stop pin 156 which is engaged by a cooperating stop pin 158 on the housing 134 of the drive unit to limit downward swinging of the unit in this position.

The attachment of the hitch arms to the rear wheels of the towing vehicle is highly desirable, if not mandatory, since the forces exerted on the vehicle by the hitch arms are thereby transmitted directly through the wheels to the road and not to the vehicle chassis which would be shifted with respect to the wheels under the action of such forces. For example, longitudinal unbalance of the mixing drum 22 creates a twisting force in the hitch which produces an upward force on the forward end of one hitch arm and a downward force on the forward end of the other hitch arm. As already noted, these forces are minimized by the mechanical advantage resulting from the crossed arm construction of the present hitch.

If the hitch arms were attached to the chassis of the towing vehicle, the forces on the hitch arms would tend to tilt the chassis. Also, during towing, rotation of an unbalanced drum tends to cause the ends of the drum to rock up and down about the central tread 24 thereby rocking the forward ends of the hitch arms up and down. If the arms were attached to the chassis of the vehicle, it would be rocked from side to side under the action of these forces.

Moreover, the fore and aft and transverse forces exerted by the hitch arms on the vehicle, especially during cornering, would produce objectionable jolting and side sway of the vehicle chassis thereby causing whipping of the drum and wheel.

Another highly important advantage of attaching the mixer to the rear wheels of the towing vehicle rather than to its chassis is that during cornering, the chassis tends to lean outwardly under the action of centrifugal force. If the mixer were attached to the chassis, then, it would be forced to lean outwardly with the chassis, thereby making it more difficult to resist endwise tipping of the drum under the action of centrifugal force. A later form of the invention further aids in this balance of the drum during cornering.

As just mentioned, any longitudinal unbalance in the mixing drum 22 while it is being towed causes the ends of the drum to oscillate up and down about the central tread 24. This, in turn, creates twisting forces in the hitch which rock the forward ends of the hitch arms up and down. It is evident that the springs 70 in the vehicle attachment means 56 cushion these unbalance forces.

FIG. 16 illustrates another way in which this cushioning action may be achieved. In this case, the hitch arms 160 and 162 mount sleeves 164 and 166 which can slide along their respective hitch arms. These sleeves are rotatably and yieldably interconnected by an axially yieldable pivot means 168.

Pivot means 168 comprises a coil spring 170 which is rotatably connected at its ends to the sleeves 164 and 166, respectively, so that the hitch arms 160 and 162 can move laterally and rotate with respect to one another in the manner of the hitch arms 38 and 40 in FIG. 3 during cornering. The spring 170 of this yieldable connection obviously provides the hitch with a limited yieldable flexibility in twist so as to cushion unbalance forces in the mixing drum as did the springs 70 in the vehicle hitch 36.

It will be obvious that the concrete mix 104 can be placed directly in the mixing drum 22 rather than being contained in a replaceable cartridge as in FIG. 1. The mixing drum 200 in FIG. 13 is designed to receive the concrete mix directly, in this way. This modified drum 200 is generally identical to the mixing drum 22 previously described except that the modified drum 200 does not contain a replaceable cartridge and does not have a hinged end. Concrete mix may be placed in the drum through the upturned spout by rotating the drum in the mixing direction on rollers. Also, the modified drum has internal mixing vanes, not shown.

Drum 200 has a spout 206 which normally occupies its position of FIG. 12 and which is swingable to an inverted position, in the same way as the prior spout 26, for discharging mixed concrete from the drum into a receptacle. As previously described, the mixed concrete can be discharged from the drum by backing of the towing vehicle.

In the alternative, the modified drum may be provided with the previously described drive unit for rotating it in the reverse direction.

Drum 200 is attached to a towing vehicle 208 by means of a modified vehicle hitch 210. This modified hitch comprises a pair of crossed, interfitting hitch arms 212 and 214 substantially identical to the hitch arms 38 and 40 previously described. The forward ends of the hitch arms 212 and 214 are bent downwardly at right angles and rotatably fitted in bearing sleeves 216 rigidly mounted on a U-frame 218. U-frame 218 comprises parallel side members 220 which extend forwardly along opposite sides of the towing vehicle and mount, at their forward ends, vehicle attachment means 222 identical to the vehicle attachment means 64 previously described. It is evident at this point, therefore, that the bearing sleeves 216 and the hitch arm ends received in these sleeves together constitute front pivot bearings on the hitch arms 212, 214. The wheel coupling plates 76 of the vehicle hitch 210 are rotatably mounted on one part of these front pivot bearings, i.e., on the bearing sleeves 216, by means of the forwardly extending arms 220 of the U-frame 218 and the yokes on the forward ends of these arms. The rear ends of the side members 220 are rigidly joined by a cross member 224 which extends across the rear of the towing vehicle. This cross member can be further supported by spring loaded swivel wheels 226 which will minimize the strain on the bearing sleeves under heavy payloads.

In this modified vehicle hitch, all of the forces are, again, transmitted directly to the rear wheels of the towing vehicle so that the advantages discussed earlier in connection with the previous vehicle hitch are obtained. The modified vehicle hitch 210 possesses one advantage over the previous hitch in that the crossed hitch arms 212 and 214 are hinged at the rear of the towing vehicle thereby allowing a smaller turning radius than is possible with the previous hitch, which is limited in its turning radius by contact of the hitch arm with the rear fenders of the towing vehicle during cornering, as may be readily observed in FIG. 3. The crossed, interfitting hitch arms 212 and 214, of course, support the mixing drum 200 against endwise tipping.

FIGS. 14 and 15 illustrate a portion of a modified U-frame 300 to replace the U-frame 218 in the vehicle hitch 210. U-frame 300 comprises side members 302 (only one shown) to extend along the sides of the towing vehicle. Each side member is composed of telescopically interfitting parts 304 and 306 which are releasably locked in adjusted position by means of a pin 308 carried on the member 306 and engageable in holes 310 in member 304. The modified U-frame is made adjustable in this way so that it may be accommodated to automobiles of various sizes.

The vehicle attachment means 312 on the side members 302 of the modified frame comprises simply a journal bearing 314 welded at right angles to the member 306 and a journal 316 within the bearing mounting, at its inner end, a wheel coupling plate 318 identical to that previously described.

Figure 17:
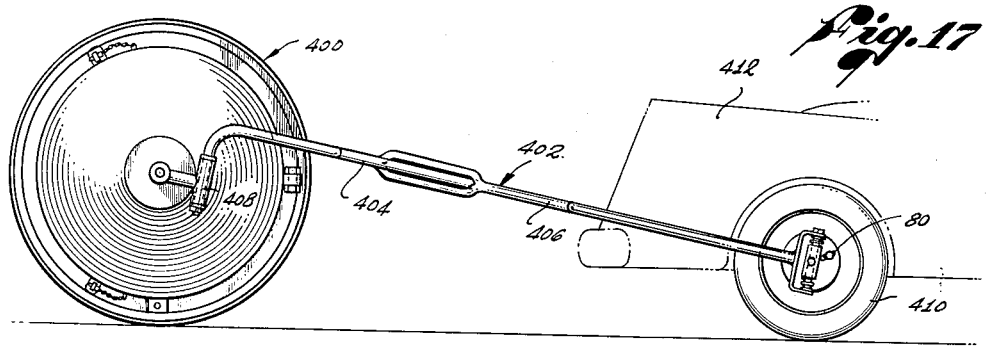
FIG. 17 illustrates a further modified form of the vehicle hitch of the invention which causes the mixing drum to lean toward the inside of a curve during cornering.
Figure 18:
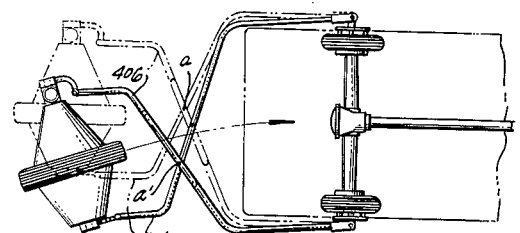
FIG. 18 is a plan view, on reduced scale, of the mixer in FIG. 17 showing certain actions which occur during cornering.
Figure 19:
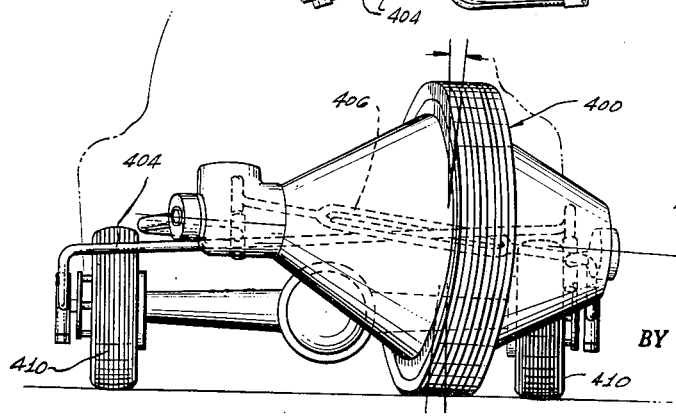
FIG. 19 is a rear view of the mixer in FIG. 17 illustrating how the mixing drum leans during cornering.

Reference is now made to FIGS. 17–19 of the drawings. In these figures, there is shown a mixing drum 400 of the type shown in FIG. 1 and a vehicle hitch 402 which is identical to that shown in FIG. 1 with the exception that the rear ends of the two hitch arms 404 and 406 are located above the axis of the drum and are bent downwardly to fit in the pivot bearings 408 on the drum. The forward ends of the arms are attached to the rear wheels 410 of the towing vehicle 214 in the same manner as described in connection with the hitch of FIG. 1 and are located below the rear ends of the hitch arms so that the latter are inclined, as shown.

When movement of the mixer is along a straight line, the hitch arms 404 and 406 cross at a point $a$ in FIG. 18 which occupies the same relative position along both hitch arms, and the axis of the mixing drum is horizontal. Now assume that the drum is towed around a right-hand curve, as shown in full lines in FIG. 12. During this turn, the hitch arms pivot and slide with respect to one another, from their phantom line positions to their full line positions, resulting in movement of the crossing point of the arms rearwardly along the arm which connects to the end of the drum at the inside of the curve, namely, arm 404, and forwardly along the arm which connects to the end of the drum at the outside of the curve, namely, arm 406, to a final position $a'$. This shift in the crossing point of the arms lowers the rear end of the inner arm 404 and elevates the rear end of the outer arm 406 resulting in endwise tipping or "leaning" of the mixing drum 400 toward the inside of the curve, as shown in FIG. 19. This inward leaning of the drum, of course, shifts the center of gravity of the drum toward the inside of the curve with the consequence that the resultant of the outwardly directed centrifugal force acting on the drum owing to the latter moving along a curved path, and the downward gravitational force on the drum approaches an ideal direction through the point of contact of the drum tread with the ground, in which ideal case, of course, the drum is balanced. Cornering to the left, obviously, results in a similar but opposite action to "lean" drum to the left.

Thus, the vehicle hitch arrangement of FIGS. 17–19 causes the mixing drum to lean, during cornering, toward the inside of the turn, thereby partially or completely offsetting the action of centrifugal force on the drum. Since the mixer is attached to the rear wheels rather than the chassis of the towing vehicle, of course, the drum is not forced to lean outwardly with the chassis during cornering, as already discussed. The hitch arrangement of FIGS 17–19, therefore, permits cornering at appreciably higher speeds than the hitch arrangement of FIGS. 1 or 13.

It is clear, therefore, that the invention hereinbefore described and illustrated is fully capable of attaining the several objects and advantages preliminarily set forth.

While certain preferred embodiments of the invention have been disclosed for illustrative purposes, numerous modifications in the design, arrangement of parts and instrumentalities of the invention are possible within the spirit and scope of the following claims.

What is claimed is:

1. In combination, a transporting drum having a central axis of rotation and an external, coaxial tread intermediate its ends to support the drum for rolling movement along the ground, a pair of crossed hitch arms having front and rear ends, means slidably connecting said arms where they cross, the rear ends of said arms straddling said drum in its endwise direction, bearing members rotatably supported on the ends of the drum, respectively, for turning on the central axis of the drum, pivot bearing means connecting the rear ends of the arms to said bearing members for pivoting of the arms with respect to the drum on axes normal to said central axis and to the plane of the arms including a first bearing part rigidly and immovably fixed to the rear end of each arm and a second bearing part rigidly and immovably fixed to each bearing member and pivotally engaged with the adjacent first bearing part, a U-frame, a pair of wheel coupling plates rotatably supported on the free ends of the arms of said frame for rotation on an axis parallel to the cross member of the frame, and pivot bearing meams connecting the front ends of said hitch arms to said cross member on pivot axes normal to the plane of said hitch arms.

2. In combination, a drum having a central axis of rotation and adapted to contain a cargo to be transported, an external, coaxial tread encircling said drum intermediate its ends to support the drum for rolling movement along the ground, a pair of crossed hitch arms having front and rear ends, means slidably connecting said arms where they cross, the rear ends of said arms straddling said drum in its endwise direction, bearing members rotatably supported on the ends of said drum for turning on the central axis of the drum, rear pivot bearings connecting the rear ends of said arms to their respective adjacent drum bearing members, each said rear pivot bearing including a first bearing part rigid on the rear end of the respective hitch arm and a second bearing part rigid on the adjacent drum bearing member and pivotally joined to the respective first bearing part, front pivot bearings at the front ends of said hitch arms, respectively, each said front pivot bearing including a first bearing part rigid on the front end of the respective hitch arm and a second bearing part pivotally joined to the first bearing part of the respective front pivot bearing, said front and rear pivot bearings having pivot axes approximately normal to the plane of said hitch arms, a pair of vehicle coupling members located forwardly of said hitch arms, means rotatably mounting said coupling members on said second bearing parts of said front pivot bearings, respectively, for turning of said coupling members approximately on a common axis transverse to the front ends of said hitch arms and generally parallel to the plane of said hitch arms, and means for securing said coupling members to a towing vehicle.

3. In combination, a drum having a central axis of rotation and adapted to contain a cargo to be transported, an external, coaxial tread encircling said drum intermediate its ends to support the drum for rolling movement along the ground, a pair of crossed hitch arms having front and rear ends, means slidably connecting said arms where they cross, the rear ends of said arms straddling said drum in its endwise direction, bearing members rotatably supported on the ends of said drum for turning on the central axis of the drum, rear pivot bearings connecting the rear ends of said arms to their respective adjacent drum bearing members, each said rear pivot bearing including a first bearing part rigid on the rear end of the respective hitch arm and a second bearing part rigid on the adjacent drum bearing member and pivotally joined to the respective first bearing part, front pivot bearings at the front ends of said hitch arms, respectively, each said front pivot bearing including a first bearing part rigid on the front end of the respective hitch arm and a second bearing part pivotally joined to the first bearing part of the respective front pivot bearing, said front and rear pivot bearings having pivot axes approximately normal to the plane of said hitch arms, a pair of wheel coupling plates located forwardly of said hitch arms for straddling the rear wheels of a towing vehicle, means rotatably mounting said coupling plates on said second bearing parts of said front pivot bearings, respectively, for turning of said coupling plates approximately on a common axis transverse to the front ends of said hitch arms and generally parallel to the plane of said hitch arms, and means for securing said coupling plates to said rear vehicle wheels.

4. In combination, a mixing and transporting drum having a central axis of rotation and adapted to contain ingredients to be mixed, an external, coaxial tread encircling said drum intermediate its ends to support the drum for rolling movement along the ground, a pair of crossed hitch arms having front and rear ends, means slidably connecting said arms where they cross, the rear ends of said arms straddling said drum in its endwise direction, bearing members rotatably supported on the ends of said drum for turning on the central axis of the drum, rear pivot bearings connecting the rear ends of said arms to their respective adjacent drum bearing members, each said rear pivot bearing including a first bearing part rigid on the rear end of the respective hitch arm and a second bearing part rigid on the adjacent drum bearing member and pivotally joined to the respective first bearing part, front pivot bearings at the front ends of said hitch arms, respectively, each said front pivot bearing including a first bearing part rigid on the front end of the respective hitch arm and a second bearing part pivotally joined to the first bearing part of the respective front pivot bearing, said front and rear pivot bearings having pivot axes approximately normal to the plane of said hitch arms, a pair of vehicle coupling members located forwardly of said hitch arms, means rotatably mounting said coupling members on said second bearing parts of said front pivot bearings, respectively, for turning of said coupling members approximately on a common axis transverse to the front ends of said hitch arms and generally parallel to the plane of said hitch arms, said drum rotating in a given direction when it is towed forwardly over the ground, said drum containing two sets of internal, generally helical vanes which are oppositely inclined to feed the contents of said drum toward the center of the drum when the latter rotates in said given direction, and there being an opening in one end of said drum through which the contents of said drum are adapted to be discharged by rotation of said drum in the opposite direction.

5. In combination, a towing vehicle, a drum behind said vehicle having a central axis of rotation and adapted to contain a cargo to be transported, an external, coaxial tread encircling said drum intermediate its ends to support the drum for rolling movement along the ground, a pair of crossed hitch arms having front and rear ends, means slidably connecting said arms where they cross, the rear ends of said arms straddling said drum in its endwise direction, bearing members rotatably supported on the ends of said drum for turning on the central axis of the drum, rear pivot bearings connecting the rear ends of said arms to their respective adjacent drum bearing members, each said pivot bearing including a first bearing part rigid on the rear end of the respective hitch arm and a second bearing part rigid on the adjacent drum bearing member and pivotally joined to the respective first bearing part, front pivot bearings at the front ends of said hitch arms, respectively, each said front pivot bearing including a first bearing part rigid on the front end of the respective hitch arm and a second bearing part pivotally joined to the first bearing part of the respective front pivot bearing, said front and rear pivot bearings having pivot axes approximately normal to the plane of said hitch arms, a pair of vehicle coupling members located forwardly of said hitch arms, means rotatably mounting said coupling members on said second bearing parts of said front pivot bearings, respectively, for turning of said coupling members approximately on a common axis transverse to the front ends of said hitch arms and generally parallel to the plane of said hitch arms, means securing said coupling members to the rear of said towing vehicle in such manner that said turning axis of said coupling members is generally parallel to the turning axis of the rear wheels of said towing vehicle, and said hitch arms sloping downwardly toward their front ends, whereby said drum is caused to lean toward the inside of the curve during cornering.

References Cited by the Examiner

UNITED STATES PATENTS

| | | | |
|---|---|---|---|
| 624,200 | 5/1899 | Fisher | 259—176 |
| 738,884 | 9/1903 | Clay | 280—503 |
| 1,020,393 | 3/1912 | Almgren | 280—458 |
| 1,027,982 | 5/1912 | Brodie | 259—176 |
| 1,150,896 | 8/1915 | Smith | 259—175 |
| 1,512,611 | 10/1924 | Konetsky | 280—503 X |
| 1,952,922 | 3/1934 | Jones | 259—175 |
| 2,124,947 | 7/1938 | Henderson | 280—458 X |
| 2,171,846 | 9/1939 | Davidson | 280—458 X |
| 2,210,007 | 8/1940 | Rodin | 280—444 |
| 2,325,822 | 8/1943 | Whitmer | 280—476 |
| 2,477,568 | 8/1944 | Beckwith | 259—177 |
| 2,547,787 | 4/1951 | Siebring et al. | 259—176 |
| 2,565,939 | 8/1951 | Wriston | 220—63 |
| 2,622,891 | 12/1952 | Knapp | 280—476 |
| 2,792,238 | 5/1957 | Schaa | 280—458 |
| 2,913,256 | 11/1959 | Sharpe | 280—494 |
| 2,950,906 | 8/1960 | Hilkemeier | 259—161 |

FOREIGN PATENTS 653,996    5/1951    Great Britain.

BENJAMIN HERSH, *Primary Examiner.*

HERBERT L. MARTIN, LEO QUACKENBUSH, A. HARRY LEVY, *Examiners.*